United States Patent [19]

Khanna

[11] Patent Number: 4,676,963
[45] Date of Patent: Jun. 30, 1987

[54] MANUFACTURE OF SODIUM TRIPOLYPHOSPHATE FROM WET ACID

[75] Inventor: Nirmal K. Khanna, Scotch Plains, N.J.

[73] Assignee: FMC Corporation, Philadelphia, Pa.

[21] Appl. No.: 861,163

[22] Filed: May 9, 1986

[51] Int. Cl.$^4$ .................... C01B 15/16; C01B 25/235; C01B 25/41; C01B 25/46

[52] U.S. Cl. .................... 423/315; 423/309; 423/313; 423/318; 423/321 R; 423/321 S

[58] Field of Search .............. 423/309, 313, 315, 318, 423/320, 321 S, 321 R

[56] References Cited

U.S. PATENT DOCUMENTS

| | | | |
|---|---|---|---|
| 2,883,266 | 4/1959 | Hodges et al. | 23/88 |
| 3,151,936 | 10/1964 | Hollingsworth et al. | 23/109 |
| 3,309,174 | 3/1967 | Pals | 423/315 |
| 3,410,656 | 11/1968 | Bunin et al. | 23/165 |
| 3,455,651 | 7/1969 | Satterwhite et al. | 23/165 |
| 3,506,394 | 4/1970 | Okamura et al. | 23/88 |
| 3,554,694 | 1/1971 | Barker et al. | 23/88 |
| 3,574,535 | 4/1971 | Molodovan et al. | 423/309 |
| 3,607,029 | 9/1971 | Goret et al. | 23/165 |
| 3,661,514 | 5/1972 | Herink | 423/315 |
| 3,714,330 | 1/1973 | Barker | 423/321 |
| 3,800,029 | 3/1974 | Omoto et al. | 423/321 |
| 4,024,225 | 5/1977 | Chiang | 423/305 |
| 4,086,322 | 4/1978 | Drechsel | 423/309 |
| 4,117,092 | 9/1978 | Beltz et al. | 423/313 |
| 4,132,540 | 1/1979 | Edwards et al. | 71/34 |
| 4,146,575 | 3/1979 | Gallistru et al. | 423/313 |
| 4,160,657 | 7/1979 | Drechsel | 423/309 |
| 4,191,734 | 3/1980 | Dreshsel | 423/309 |
| 4,285,920 | 8/1981 | Jassal | 423/305 |
| 4,328,196 | 5/1982 | Sardisco et al. | 423/309 |
| 4,590,051 | 5/1986 | Shimp | 423/315 |

Primary Examiner—Andrew H. Metz
Assistant Examiner—Anthony McFarlane
Attorney, Agent, or Firm—Frank Ianno; Eugene G. Seems

[57] ABSTRACT

A process is described for converting wet acid into sodium tripolyphosphate by pretreating the wet acid in a pretreatment stage with a sodium source and $SiO_2$ to precipitate fluoride values from the wet acid, solvent extracting the pretreated wet acid to remove further impurities, reacting the solvent extracted acid with a sodium source in a made up stage to form a sodium orthophosphate liquor, heating the resulting liquor in a calcining stage to produce sodium tripolyphosphate, passing gases from the calcining stage into a scrubber liquor to remove fluoride impurities and entrained sodium tripolyphosphate, recycling scrubber liquor to the make up stage to recover sodium tripolyphosphate values, and removing a bleed stream from the recycled scrubber liquor and recycling it to the pretreatment stage to remove fluoride impurities therein in the pretreatment stage.

14 Claims, 1 Drawing Figure

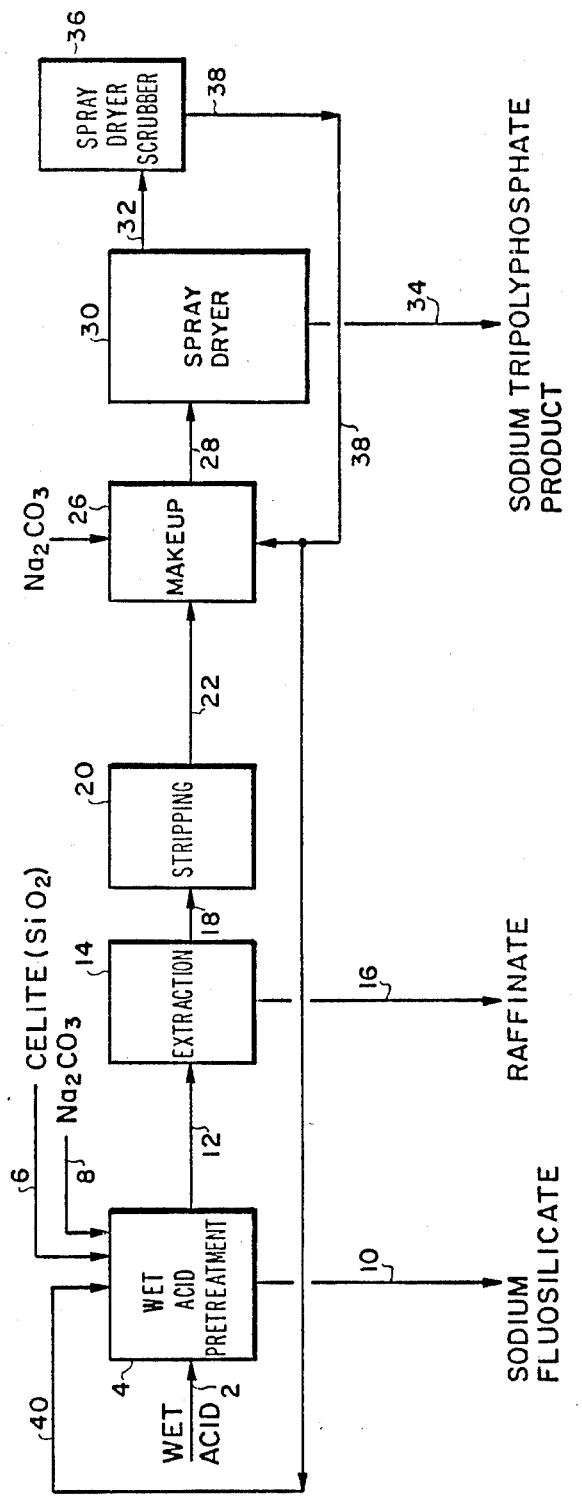

MANUFACTURE OF SODIUM TRIPOLYPHOSPHATE FROM WET ACID

The present invention is concerned with the production of a purified sodium tripolyphosphate derived from wet phosphoric acid, and especially to the recovery and treatment of fluorides evolved in such process.

It is known that wet phosphoric acid (wet acid) can be obtained by acidulating phosphate rock, normally with sulfuric acid alone or admixed with other mineral acids. The resulting mass is decanted and filtered to yield a filtrate of crude phosphoric acid, termed "wet acid" or "green acid," which contains numerous cationic and anionic impurities including Al, Fe, v, Mg and Ca cations and anions of the attack acid along with fluorides and chlorides, derived from the rock being acidulated. This wet acid, while suitable for certain agricultural applications, cannot be used to produce acceptably pure sodium tripolyphosphate without some purification of the wet acid before such use.

One typical purification step which has been described in the art, is the solvent extraction of the wet acid with an alkyl phosphate, followed by stripping of the extract with water to recover a purified acid substantially free of most of the cationic impurities. This process is described in U.S. Pat. No. 3,410,656 issued Nov. 12, 1968. variations of this process include U.S. Pat. No. 3,607,029 issued Sept. 21, 1971, wherein a strong acid such as pure sulfuric acid is added to the extraction column along with the alkyl phosphate extractant to increase the amount of phosphoric acid recovered. The subject matter of these U.S. Pat. Nos. 3,410,656 and 3,607,029, are hereby incorporated by reference into the present specification and are relied upon to explain and support operation of the solvent extraction process per se.

After the wet acid has been purified by solvent extraction, it then is employed as one of the feed ingredients in the preparation of sodium tripolyphosphate.

In this operation, the purified wet acid is reacted with either sodium hydroxide or sodium carbonate in amounts sufficient to neutralize the acid and form a sodium orthophosphate solution wherein the sodium to phosphorus ratio is about 1.67. The orthophosphate solution, thus prepared, is then passed into a heating zone, typically a rotary kiln or a spray dryer, where the orthophosphate solution is converted to sodium tripolyphosphate. The gas stream issuing from the spray dryer or rotary kiln is removed from the heating zone and first passed through a bag house unit or centrifugal separator to separate the bulk of the entrained, solid, sodium tripolyphosphate fines. The resulting gas stream containing the remaining sodium tripolyphosphate fines then is passed through an aqueous scrubber where most of the entrained sodium tripolyphosphate is removed along with any volatile fluoride and chloride impurities vaporized during the heating of the sodium orthophosphate liquor.

One difficulty that has arisen in this process is that fluoride values present in the phosphate rock used to make the wet acid are carried forward through the various processing steps and a substantial amount remains in the orthophosphate liquor that is sent to the heating zone to form sodium tripolyphosphate. When these fluoride values are present in large enough quantities, a substantial amount remains with the sodium tripolyphosphate product which is undesirable. Additionally, the large amount of fluoride evolved during the heating stage in the process of making sodium tripolyphosphate, is caught in the scrubber liquor and must be treated for proper disposal. Typically, these are treated with lime and the resulting insoluble calcium fluoride must be removed in a separate filtration stage and disposed of as a separate waste product. The proper removal of these waste products becomes more difficult and costly as ecological considerations and disposal requirements become more stringent. Also, recycle of the remaining filtrate after lime addition and filtration to recover phosphate values therein, contaminates the sodium tripolyphosphate product with calcium cations remaining dissolved in the scrubber liquor filtrate.

It has now been found that the problems encountered with fluoride contamination of wet acid used to produce sodium tripolyphosphate can be overcome by (a) introducing said wet acid containing fluorides into a pretreatment stage, adding silicon dioxide and sodium hydroxide or a sodium salt and precipitating insoluble fluorides, (b) separating the insoluble fluorides from the resulting pretreated wet acid, (c) introducing the pretreated wet acid of step (b) into a solvent extraction zone with a substantially water insoluble organic phosphate extractant and extracting phosphoric acid values from such pretreated wet acid, (d) stripping the extracted phosphoric acid values from the loaded organic phosphate extractant of step (c) with an aqueous stripping solution, and recovering a purified phosphoric acid, (e) adding the purified phosphoric acid to a make up stage and reacting it with sodium hydroxide or a sodium salt to produce a sodium orthophosphate liquor having a Na:P mole ratio of about 1.67:1, (f) introducing the sodium orthophosphate liquor into a heating zone to form sodium tripolyphosphate and recovering same, (g) passing the gases evolved in the heating zone through a scrubbing zone containing a scrubber liquor and scrubbing fluoride values and entrained sodium tripolyphosphate from said gases into said scrubber liquor, (h) recycling scrubber liquor to the make up stage, and (i) removing a bleed stream from said recycling scrubber liquor and introducing said bleed stream into said pretreatment stage in amounts to maintain fluoride impurities at a stable level in said recycling scrubber liquor.

By carrying out the above process, the fluoride contamination of the wet acid can be reduced in an economically desirable manner to produce a sodium tripolyphosphate having acceptably low levels of fluoride contamination. Additionally, the fluoride collected in the scrubber liquor can be removed in a convenient manner without having to lime the fluoride values and separately dispose of them. Further, the tripolyphosphate values present in the scrubber liquor can in large measure be recovered without contaminating the sodium tripolyphosphate product with calcium ions remaining in the scrubber liquor filtrate after conventional lime addition and filtration.

BRIEF DESCRIPTION OF THE DRAWING

The drawing is a schematic of the present process of treating wet acid through various stages of pretreatment and solvent extraction followed by conversion of the acid to a sodium orthophosphate solution and the conversion of the sodium orthophosphate solution into sodium tripolyphosphate.

In carrying out the present invention, "wet acid" is obtained by recovering the phosphate values from a phosphatic ore in the form of phosphoric acid. In this process, phosphate rock, which generally contains phosphorus in the form of $Ca_{10}F_2(PO_4)_6$ is acidulated with a mineral acid, normally sulfuric acid, either alone or in conjunction with another mineral acid such as phosphoric acid, to precipitate calcium values as calcium sulfate and to recover the impure phosphoric acid termed "wet acid." The resulting wet acid is recovered by filtering it from insolubles in the acidulated mixture, but it is contaminated with soluble cationic impurities including aluminum, iron, vanadium, magnesium and calcium cations along with soluble fluorides and chlorides and soluble anions of the attack acid or acids used in the acidulation. Such wet acid is unsuitable for use in producing sodium tripolyphosphate because the large amounts of soluble cationic and anionic impurities and fluoride contamination would end up in the final sodium tripolyphosphate product.

In accordance with the present invention, the wet acid is introduced into a pretreating stage along with a source of silica and sodium. The silica is added preferably as $SiO_2$ in a finely dispersed state, one example being celite which is also used subsequently as a filter aid. The celite is desirable to assure that all fluoride impurities, for example, HF or NaF, are present in the wet acid as fluorosilicate acid ($H_2SiF_6$). The sodium is added as sodium hydroxide or as a sodium salt whose anion forms a volatile gas when it contacts the phosphoric acid. Examples of suitable sodium salts include sodium carbonate, sodium bicarbonate, sodium sesquicarbonate, trona, Wegscheider salts, and the like. Most preferred is sodium carbonate. The added sodium hydroxide or sodium carbonate (and the celite of HF or NaF are present) react with the fluoride values in the acid to form sodium fluorosilicate ($Na_2SiF_6$) which precipitates in the solution and substantially reduces the fluoride concentration of the wet acid. As will be explained hereinafter, part of the sodium requirements in this pretreatment stage will also be supplied by sodium values from a bleed stream containing sodium tripolyphosphate, which on contact with an acid solution reverts to sodium orthophosphate and which then makes its sodium values available in the pretreatment stage. The resulting slurry in the pretreatment stage is filtered or otherwise separated to remove the sodium fluorosilicate precipitate leaving a pretreated wet acid whose fluoride has been substantially reduced.

The pretreated wet acid is then passed into a solvent extraction unit (also termed "Solvex") which can be one or more extraction zones. In this stage, the acid is passed preferably into the top of an extraction column and extracted countercurrently with an organic extraction solution which is substantially water insoluble. The organic extraction solution is made up of either an alkyl phosphate, an aryl phosphate or alkylaryl phosphate that contains no more than about 8 carbon atoms on the aryl or alkyl substituent. Examples of such alkyl phosphates are tri-n-butylphosphate, triethylphosphate, triisobutylphosphate, diethylhexylphosphate, tris(2-ethylhexyl)phosphate, trioctylphosphate, and ethyl dibutylphosphate. In addition, certain alkoxy substituted alkyl phosphates are operative such as tris-butoxyethyl phosphate and are included in the term "alkyl phosphate." Examples of aryl phosphates that have been found workable are tricresylphosphate, dicresylxylylphosphate and cresyldiphenylphosphate. The preferred phosphate is tri-n-butylphosphate.

The alkyl or aryl phosphate can be used alone or it can be diluted with an organic solvent that has limited solubility in water to improve phase separation. Suitable solvents include benzene, toluene, xylene, monochlorobenzene, o-dichlorobenzene, decahydronaphthalene, low boiling petroleum hydrocarbons such as petroleum naphtha, kerosene, and saturated aliphatic hydrocarbons such as N-hexane. When a solvent is employed, the volume ratio of organic phosphate to solvent may be from 10:1 to 0.5:1 with a ratio of 3:1 being preferred. The volume ratio of organic extraction solution to wet acid can vary from about 1:1 to about 10:1. The organic extracting solution can be used alone to extract the wet acid solution or can be used in conjunction with sulfuric acid which is added in minor amounts near the base of the extraction column to increase the amount of phosphoric acid values extracted into the organic extractant.

In the extraction stage of the process, $P_2O_5$ values present in the wet acid are loaded into the organic extract leaving behind the bulk of the mineral impurities in a raffinate. The extraction step can be carried out in any suitable extraction device such as agitated columns, mixer-settlers, liquid-liquid centrifugal contactors and the like. Preferred are the agitated columns which allow efficient liquid to liquid contact between the wet acid and the organic extracting solution. The resulting raffinate which contains unextracted $P_2O_5$ values and mineral impurities in an aqueous solution can be employed in producing fertilizer, for example, triple superphosphate, thereby utilizing unextracted $P_2O_5$ values. The extraction step is normally carried out at temperatures of from 20° C. to 100° C. for best results, with room temperatures being employed for ease of operation.

The organic extract may then be passed, if necessary, to a scrubber unit where it is scrubbed with an aqueous phosphoric acid of greater purity than the wet acid: product acid or aqueous $H_3PO_4$ from the stripper (as defined hereinafter) is normally used for this purpose. In this step, a large portion of the iron and other metal impurities can be removed from the organic extract if they are present in excess amounts. The volume ratio of organic extract to phosphoric acid can range from 10:1 to about 40:1 with about 20:1 being preferred. In this operation, enough pure acid is added to the organic extract to remove the mineral impurities in the organic extract below any required level. The exact amount of acid used will depend upon the initial impurity level of the organic extract. This scrubbing step can be carried out in the same type of equipment specified for the extraction step and is preferably carried out at a temperature of 20° C. to 100° C., with ambient room temperatures being employed for ease of operation. If the metal impurities level is sufficiently low, this step can be eliminated.

The concentration of phosphoric acid used for scrubbing, where the step is employed, is normally about the same as the concentration of the original wet acid feed in order that it may be in equilibrium with the $P_2O_5$ values in the organic extract. In this way, no $P_2O_5$ values are transferred between the organic phase and the scrubbing phosphoric acid; this is the preferred mode of operation in continuous processing.

The scrubbed organic extract is then passed into the base of a stripping column and stripped of its $P_2O_5$ values by contacting it with water. Enough water is added to remove substantially all of the $P_2O_5$ values present in the scrubbed organic extract. If desired, the water used for stripping the $P_2O_5$ values may contain salts such as alkali metal carbonates, phosphates or hydroxides to facilitate the stripping. In general, it is not desirable to remove the last traces of $P_2O_5$ from the scrubbed organic extract since this would necessitate using excessive amounts of water and would result in unnecessary dilution of the resultant aqueous acid extract. Good results have been obtained with volume ratios of scrubbed organic extract to water of from 5:1 to 12:1, the exact ratio depending upon the amount of $P_2O_5$ in the scrubbed organic extract. The stripping is preferably carried out at temperatures of from 20° C. to 100° C., with ambient room temperature being employed for ease of operation.

After the stripping operation has been completed, the aqueous phosphoric acid extract, containing substantially all of the $P_2O_5$ values extracted from the wet acid feed, is recovered separate from the stripped organic extracting solution. The organic solution, prior to being recycled for additional use, may be purified, for example, by treatment with activated charcoal, an alkali wash, and/or distillation to remove soluble organic wastes, before it is recycled to the extraction zone for further extraction of $P_2O_5$ values.

The resulting purified phosphoric acid nevertheless contains fluorine impurities, chiefly in the form of fluorosilicates or fluorides. It is possible to remove these fluorine impurities by heating the phosphoric acid extract to temperatures of from 110° C. to 150° C. to expel the fluorine. However, such a heating step to remove the fluorine is costly since all of the phosphoric acid must be heated to this high temperature and maintained at that temperature for a period of time to expel the fluorine. Further, even if this costly treatment were carried out, the fluorine thus vaporized would have to be caught in an aqueous scrubber of some type and the scrubber liquor limed to precipitate calcium fluoride. This would necessitate a separate disposal of calcium fluoride in the process which also is costly and difficult.

In place of this, the aqueous phosphoric acid extract containing the fluoride impurities is passed into a make up zone where it is treated with sodium hydroxide or a sodium salt whose anion forms a volatile gas when combined with phosphoric acid to produce a sodium orthophosphate solution. The sodium salts that are useful include sodium carbonate, sodium bicarbonate, sodium sesquicarbonate, trona, Wegscheider salts. Sodium carbonate is preferred. Sufficient sodium hydroxide or sodium carbonate is added to form a sodium orthophosphate solution in which the sodium to phosphorus value is about 1.67. This is the accepted make up liquor (also called "ortho liquor") employed in producing sodium tripolyphosphate.

The sodium orthophosphate solution is then passed into a heating or calcining zone in which the solution is heated to vaporize the water in the solution and to convert the sodium orthophosphate salt into sodium tripolyphosphate. In general, the calcining or heating zone is either a rotary kiln or a spray dryer. In the case of a rotary kiln, the solution is placed at one end of the kiln and is gradually heated as it progresses down the kiln until all the water of solution has evaporated and the remaining sodium phosphate salts are continued to be heated so that molecular dehydration takes place and sodium tripolyphosphate is produced from the sodium orthophosphate mixture. The sodium tripolyphosphate spill from the end of the rotary kiln is then cooled, screened and recovered as product.

If a spray dryer is employed to form sodium tripolyphosphate from the sodium orthophosphate solution, the solution is spryed into a zone containing hot gases where the water in the solution is quickly vaporized and the sodium orthophosphate salts are quickly converted to sodium tripolyphosphate within the dryer. One example of such process is set forth in U.S. Pat. No. 3,607,019 issued on Sept. 21, 1971, wherein the solution is introduced into the upper area of a spray drying zone through a plurality of atomizing nozzles, and a ring of burners surrounding the feed solution being sprayed into the dryer heats the solution to flash off the water and convert the sodium orthophosphate salts to sodium tripolyphosphate. In this operation, both the nozzle injectors of the orthophosphate solution and the burners face downwardly from the top of the spray tower.

In U.S. Pat. No. 3,661,514 issued on July 29, 1970, the liquid sodium orthophosphate solutions are sprayed through nozzles located in the side of the spray dryer pointing upwardly while the burners are in the top of the spray dryer facing downwardly. In either of these configurations, the spray drying step results in sodium tripolyphosphate being formed by rapid heating of the sodium orthophosphate liquor introduced into the spray dryer, and may be employed in the instant process.

The gas stream emanating from either the spray dryer or the rotary kiln is passed through a solid recovery zone which can be either a bag house or a centrifugal separator to remove the bulk of any sodium tripolyphosphate powder that has been entrained in the gas stream. The thus treated gas stream is then passed through a scrubber containing a liquid scrubbing solution which contacts the gas passing through the scrubber. This gas stream contains fluorine values, normally in the form of fluorides which are vaporized during the heating of the sodium orthophosphate solution to form sodium tripolyphosphate. The scrubber also takes up remaining amounts of finely powdered sodium tripolyphosphate which were not caught in either the bag house or the centrifugal separator.

In accordance with the present invention, this scrubber liquor, containing both fluoride and sodium tripolyphosphate values is returned to the make up stage so that the sodium tripolyphosphate remaining in the scrubber liquor can be recovered by once again going through the rotary kiln or spray dryer. However, if all of the scrubber liquor were continually recycled to the make up stage, the scrubber liquor would continue to remove more fluorides from the spray dryer gases and, without a fluoride exit, would eventually be saturated with respect to its fluoride content. Thereafter, fluorides would start to precipitate out from the scrubber liquor.

In order to prevent this, a bleed stream is taken from the scrubber liquor and sent to the pretreatment stage. This bleed stream, of course, will contain both fluoride values and sodium tripolyphosphate values. The fluoride values therein will be precipitated as sodium fluorosilicate with the added celite and sodium salts in the pretreatment stage. The sodium tripolyphosphate values upon contacting the acid medium will convert to sodium orthophosphate and sodium values therein will be available to supply sodium required to form sodium fluorosilicate in the pretreatment stage. The normal reaction between such sodium orthophosphate and fluorosilicate acid (the typical form in which fluorine is present in the wet acid) produces phosphoric acid and insoluble sodium fluorosilicate. The orthophosphates thus converted to phosphoric acid can be extracted in the solvent extraction stage, and recovered.

Any orthophosphate values from the bleed stream, if present as sodium orthophosphates, will be rejected during the subsequent solvent extraction stage into the raffinate and will not be recovered in the extract stream going to the production of sodium tripolyphosphate. To avoid this, a mineral acid such as sulfuric acid may be added to the solvent extractor to convert any such orthophosphate salts into phosphoric acid, in which form they will be extracted into the organic extracting solution and recovered. It is also important that the amount of sodium added to the pretreatment stage be restricted to only that amount required to form and precipitate sodium fluorosilicate, since any additional sodium values will neutralize some phosphoric acid and form sodium phosphate which will be rejected, unless acidified, in the solvent extraction stage.

The relative amount of scrubber liquor that must be bled from that being recycled to the make up stage depends on the amount of fluoride which is desired in the scrubber liquor. Obviously, the higher the amount of fluoride which is allowed to accumulate in the scrubber liquor the higher the amount of fluoride which will be recycled into the calciner zone and to which the sodium tripolyphosphate will be exposed.

Accordingly, the bleed stream of scrubber liquor which is fed to the pretreatment stage must be sufficient to meet two requirements. First, the scrubber liquor must not be allowed to accumulate sufficient fluoride so that fluoride precipitates in this stream. Secondly, the fluoride concentration in the scrubber liquor must not be allowed to increase to a point that it contaminates the sodium tripolyphosphate product with an unacceptable amount of fluoride.

In general, the lower the fluoride concentration of the scrubber liquor being recirculated through the make up stage and calcining stage, the lower will be the amount of fluoride retained in the sodium tripolyphosphate product. This in turn must be balanced with recovery of the $P_2O_5$ values from the scrubber liquor which are entirely recovered, as sodium tripolyphosphate or sodium orthophosphate, when it is recycled to the make up stage of the process. Unlike the recycle of the scrubber liquor to the make up stage, the phosphate values in the bleed stream which are fed to the pretreatment stage must be processed through the solvent extraction stage, and are not recoverable per se as sodium tripolyphosphate, or as sodium orthophosphate. For this reason, it is desired to recycle as much of the scrubber liquor as possible to the make up stage for ease of $P_2O_5$ recovery, but with a sufficient bleed stream of scrubber liquor to the pretreatment stage to prevent fluoride impurities from building up in the recycling scrubber liquor and ultimately in the sodium tripolyphosphate product to the point where they are unacceptable.

This process will now be described with reference to the attached drawing which is a schematic flow plan of the process.

In the drawing, a wet acid feed, having a normal concentration of 30% to 54% $P_2O_5$ is passed through line 2 into the wet acid pretreatment reactor 4 through line 6. Also added to the pretreatment reactor 4 is a source of silicon dioxide, preferably celite which is a finely ground silicon dioxide and which is also used as a filter aid. In addition, sodium carbonate is also added through line 8 into pretreatment reactor 4. As an alternate to the sodium carbonate, sodium hydroxide or any other sodium salt whose anion forms a volatile gas on reaction with phosphoric acid can be employed. The wet acid entering the pretreatment reactor 4 through line 2 can contain fluorides in amounts of from 3,000 to 10,000 ppm, but more typically between 5,000 and 6,000 ppm.

In pretreatment reactor 4, the sodium carbonate and celite, if HF or NaF is present, react with the fluoride present in the wet acid to form sodium fluorosilicate which precipitates from the wet acid in pretreatment reactor 4. The resulting sodium fluorosilicate filter cake containing excess celite as a filter aid is removed through line 10 and typically contains some phosphate values in the remaining liquor that is removed with the insolubles in the wet filter cake. If a wet acid plant is on site, the wet filter cake can be recycled to the acid attack tank of the wet acid plant to recover phosphate values while sodium fluorosilicate solids are removed along with the gypsum and other impurities filtered from the wet acid.

The pretreated wet acid, whose fluoride value has now been lowered to somewhere between 1,500 to 2,000 ppm is then passed through line 12 into the top of extraction column 14. An organic extracting solution (not shown) is passed into the bottom of extraction column 14 and mixed with the pretreated acid from line 12. It is preferred that the acid and extracting solution be passed countercurrently to one another in the extraction column. In extraction column 14, $P_2O_5$ values in the wet acid are loaded into the organic extract. If desired, sulfuric acid may be added to the bottom portion of the extraction column 14 to aid in increasing the amount of phosphoric acid values extracted. The bulk of the mineral impurities present in the wet acid, present generally as salts, are left behind in the raffinate along with unextracted $P_2O_5$ values and are removed from the base of the column through line 16. The raffinate will also contain substantial amounts of fluoride salts which are rejected by the organic extracting solution during its selective extraction of $P_2O_5$ values. Nevertheless, some fluoride values find their way into the organic extracting solution and are carried forward with the bulk of the $P_2O_5$ values.

The extract is removed from extraction column 14 through line 18 and passed into a scrubber (not shown). The scrubber step is carried out only if the metal impurities in the extracted solution are sufficiently high so as to require a scrubbing step to reduce them to acceptable levels. If the extracted solution is subjected to scrubbing, the loaded extract removed from line 18 is passed into a scrubber along with a purified phosphoric acid (such as that recovered from the stripping column as explained hereinafter) and mixed with the organic extract therein. The purified phosphoric acid scrubs the organic extract to remove iron and other cationic impurities from the organic extract.

The scrubbed organic extract is then removed from the scrubber and passed into the base of a stripping column 20. Water is added to the top of the stripping column 20 and mixed with the scrubbed organic extract therein. In this column water strips the $P_2O_5$ values from the organic extract and substantially all of the P₂O₅ values are removed through line 22 as phosphoric acid at the base of the stripping column 20. The stripped organic solution from stripping column 20 is treated in a solvent clean-up stage for removal of soluble organic wastes. The solvent clean-up stage may be a charcoal filter through which the organic solvent is passed and may include a distillation column for greater purification of the organic extracting solution.

The stripped phosphoric acid, purified in the extraction stage, is then passed through line 22 into a make up tank 24 where the acid is mixed with sodium carbonate from line 26 to form a sodium orthophosphate solution having a Na:P mole ratio of 1.67:1. Although sodium carbonate is shown being added to line 26 similar results can be obtained by using sodium hydroxide or a sodium salt whose anion forms a volatile gas on reaction with phosphoric acid. Suitable sodium salts include sodium bicarbonate, sodium carbonate, sodium sesquicarbonate, trona, and Wegscheider salts.

The resulting sodium orthophosphate solution from make up tank 24 is passed through line 28 and to a calcining zone such as the spray dryer 30 shown in the drawing. While the spray dryer 30 shown in the drawing is preferred as the calciner, other equipment such as rotary kilns can be used in its place. In spray dryer 30, the sodium orthophosphate liquor is heated rapidly to vaporize the water present in the sodium orthophosphate solution and then to further heat the sodium orthophosphate to produce sodium tripolyphosphate.

In the spray dryer, the rapid reaction takes place in one to five minutes. Heated gas is employed in the spray dryer to rapidly heat the sodium orthophosphate solution which is sprayed into the dryer in a finely atomized state to facilitate the drying of the sodium orthophosphate liquor and the conversion of the sodium orthophosphate salt to sodium tripolyphosphate. The sodium orthophosphate liquor can be sprayed in at the top of the spray dryer or at the base of the spray dryer in accordance with the practice well known in the art, described earlier.

The resulting sodium tripolyphosphate is removed from the base of the spray dryer through line 34 and is recovered as product. The gases generated in the spray dryer are removed through line 32 and are passed through a scrubber 36, which is normally a liquid-gas scrubber in which a scrubber liquor contacts the gas stream from line 32. The scrubbing liquor can be water alone or water in admixture with a sodium salt or sodium hydroxide to better retain the fluoride values present in the gas stream from line 32 which passes through the scrubber. Intermediate the spray dryer and the scrubber, may also be a bag house unit or centrifugal separator (not shown) to remove the major portions of entrained sodium tripolyphosphate fines which are present in the gas stream removed from the spray dryer through line 32.

The scrubber liquor containing remaining sodium tripolyphosphate values and fluoride values dissolved therein is removed from the scrubber 36 through line 38 and recycled to the make up tank 24 where the sodium tripolyphosphate values can be recovered in the make up liquor. The scrubber liquor which is returned to the make up tank 24 also contains fluorides which will reenter the make up sodium orthophosphate solution and be passed into the spray dryer and be caught again by the scrubber. As a result, if all of the scrubber liquor is returned to the make up tank there will result a cyclic loop in which fluorine will be continually absorbed by the scrubber liquor, with no exit therefor, and it will accumulate therein until its limit of solubility is reached and it precipitates in the liquor.

To avoid this, a portion of the recycled make up liquor is removed as a bleed stream 40 and passed to the wet acid pretreatment stage 4. The relative proportion of recycled scrubber liquor that is returned to the make up tank 24 to that portion bled off to the wet acid pretreatment stage 4, will depend upon the amount of fluorine which can be accumulated in the scrubber liquor recycled without adversely effecting the purity level of the sodium tripolyphosphate product. Since the fluorine present in the recycled scrubber liquor passes through the spray dryer, the higher the fluorine content of the scrubber liquor the higher the amounts of fluorine the product is exposed to and the greater the amount of fluorine drag-out there will be in the sodium tripolyphosphate removed from the spray dryer. While some fluorine always is found as a residual impurity in the sodium tripolyphosphate product, the amount of fluorine can be reduced by not allowing the fluorine level in the scrubber liquor to rise above some predetermined value, for example, 1,500 ppm.

A bleed stream of the scrubber liquor passed from line 40 to the wet acid pretreatment stage 4 contains fluorine values that are precipitated (along with fluorine values in the wet acid) as sodium fluorosilicate and removed through line 10 when the fluorine values contact the sodium carbonate and celite added to the wet acid pretreatment stage 4. In this way, there is no need to lime the scrubber liquor and remove fluoride values separately as calcium fluoride, which would require separate stages for handling and disposing of waste fluoride residues. The bleed stream 40 also contains sodium tripolyphosphate, and this sodium tripolyphosphate reverts to a sodium orthophosphate on contact with the acid in pretreatment stage 4. The resulting sodium phosphate reacts with fluorosilicate acid present in the wet acid to form phosphoric acid and insoluble sodium fluorosilicate. The sodium values from stream 40 are thus available along with the sodium carbonate added through line 8 to form sodium fluorosilicate. The orthophosphate portion of the reverted sodium tripolyphosphate recycled in line 40 which has been converted to phosphoric acid by the above reaction will be extracted by the organic extractant in the extraction stage 14 and recovered. If any phosphate is present as a phosphate salt (not phosphoric acid) it will be rejected by the organic extractant unless a mineral acid such as sulfuric acid is added in sufficient quantities to the extraction column 14 to convert such phosphate salt from the pretreatment stage into phosphoric acid in which form it can be extracted and recovered in the extraction column 14. In addition, it should be pointed out that the amount of sodium values added through line 8 to the pretreatment stage must be carefully restricted to that amount required to form and precipitate sodium fluorosilicate since any excess sodium will form on reaction with the wet acid, a sodium phosphate salt, which salt will not be extracted, unless acidified, in extraction column 14 by the organic extracting solution.

The following examples are given to illustrate the invention and are not deemed to be limiting thereof.

Example I illustrates a mass balance of the operation of the invention carried out in accordance with the floor plan specified in the drawing.

EXAMPLE I

A wet acid, obtained by acidulation of a phosphatic ore with sulfuric acid, was fed through line 2 into a wet acid pretreatment stage 4, along with 100 pounds per hour of celite, a source of $SiO_2$, added through line 6 and sufficient sodium carbonate added through line 8 to yield 41 pounds per hour of sodium ion. The wet acid was introduced into the pretreatment stage 4 at a rate equivalent to 9,695 pounds per hour of $P_2O_5$ and the fluoride impurities carried along therein constituted 112 pounds per hour of fluoride ion. After reaction and filtration, a filter cake containing the equivalent of 97 pounds per hour of $P_2O_5$, 34.5 pounds per hour of sodium ion and 85.6 pounds per hour of precipitated fluoride ion (as sodium fluorosilicate) was separated as a wet filter cake from the filtrate.

The pretreated wet acid, removed as filtrate through line 12 contained the equivalent of 9,747 pounds per hour of $P_2O_5$, 87 pounds per hour of sodium ion and 30 pounds per hour of fluoride ion. This was fed to an extraction column 14 and extracted with tri-n-tributylphosphate countercurrently, in the presence of sulfuric acid that was added in minor amounts into the base of column 14 to improve extraction. The loaded organic extract was then passed via line 18 into a stripping column 20 while the liquid raffinate from extraction column 14 was separated through line 16 and yielded the equivalent of 769 pounds per hour of $P_2O_5$, 87 pounds per hour of sodium ion, and 24.4 pounds per hour of fluoride ion.

The loaded organic extract fed to stripping column 20 was treated with water countercurrently to extract $P_2O_5$ values and yielded a purified acid stream containing the equivalent of 8,978 pounds per hour of $P_2O_5$ and 5.6 pounds per hour of fluoride ion. This purified acid was passed through line 22 into make up reactor 24 along with enough sodium carbonate to yield 7,497 pounds per hour of sodium ion. The resulting reaction yielded an ortho liquor containing a sodium orthophosphate solution having a Na:P of about 1.67, a $P_2O_5$ content of 9,127 pounds per hour and fluoride ion in amounts of 9.2 pounds per hour. The ortho liquor was removed from reactor 24 through line 28 and introduced into a spray dryer 30. The ortho liquor was heated by downwardly directed burners to yield 8,829 pounds per hour of sodium tripolyphosphate containing not more than about 1 pound per hour of fluoride ion. The sodium tripolyphosphate product was removed through line 34 and contained about 100 ppm of fluoride, which is considered acceptable for all but food grade purposes.

The gas stream from spray dryer 30 was removed via line 32 and sent to a liquid-gas scrubber 36, where a circulating aqueous solution retained most of the fluoride passing through the scrubber. The vent gas from the scrubber contained no higher than about one pound of fluoride ion per hour, while the scrubber liquor collected the eouivalent of 298 pounds per hour of $P_2O_5$ values, 161 pounds per hour of sodium ion and 7.2 pounds per hour of fluoride ion.

The scrubber liquor was removed from scrubber 36 through line 38, and half its volume was recycled back through line 38 to the make up reactor 24 where it yielded 149 pounds per hour of $P_2O_5$, 3.6 pounds per hour of fluoride ion and 80.5 pounds per hour of sodium ion. The other half of the scrubber liquor was removed as a bleed stream through line 40 and recycled to the pretreatment stage 4 where it yielded 149 pounds per hour of $P_2O_5$, 3.6 pounds per hour of fluoride ion and 80.5 pounds per hour of sodium ion.

Sodium tripolyphosphate in the bleed stream 40 is converted to sodium orthophosphate in the acid environment of the pretreatment stage, in which form the resulting sodium values were available directly in the pretreatment stage 4 for use in precipitating sodium fluorosilicate. Remaining orthophosphate values recycled to the pretreatment stage are converted to phosphoric acid upon reaction with $H_2SiF_6$ and are recovered in the extraction stage. Any unconverted orthophosphate salts are converted to phosphoric acid by reaction with sufficient sulfuric acid added to the extraction stage 14 to acidify such salts remaining in the pretreated acid solution.

EXAMPLE II

The following example illustrates how sodium tripolyphosphate, present in the bleed stream, when added to wet acid will make its sodium values available for reducing fluorine levels present in the wet acid, in the same way as a suitable sodium salt, for example, sodium carbonate.

A sample of a wet acid produced by acidulating phosphate rock (Chevron Green Acid) was titrated to pH 4 and pH 9 and was analyzed for its fluoride values to establish a base mark. To one 500 gram sample of wet acid, 2.5 grams of celite (a finely divided silicon dioxide) was added along with 7.5 grams of sodium carbonate (in 100 grams of water), with vigorous stirring. After remaining at 60° C. for one hour, the solution was filtered and the filtrate was titrated with alkaline hydroxide to pH 4 and pH 9 and its fluoride content analyzed. To a second 500 gram sample of wet acid, 2.5 grams of celite was added along with 10.5 grams of sodium tripolyphosphate (in 100 grams of water). After remaining at 60° C. for one hour, the solution was filtered and analyzed as was the first sample above. The results are set forth in the Table.

The titration to pH 4 indicates the acid concentration of the sample, essentially as $H_3PO_4$ (and any residual $H_2SO_4$). The titration of pH 9 indicates the total acid plus phosphate concentration of the solution (all of which phosphate will be in the form of monosodium orthophosphate). The difference between pH 4 and pH 9 will be the concentration of the monosodium orthophosphate in the solution. The small increase in concentration of acidity between the sodium carbonate sample and sodium tripolyphosphate sample is due to added phosphoric acid being formed during the reaction of sodium tripolyphosphate with fluorosilicate acid and in the wet acid to produce a sodium fluorosilicate precipitate and phosphoric acid.

As will be readily apparent from the results in the Table, the addition of sodium values, in the form of sodium carbonate or sodium tripolyphosphate, to the wet acid along with silicon dioxide, will function equally well to lower the fluoride value of the wet acid by precipitating fluoride as sodium fluorosilicate. This illustrates the effectiveness of utilizing the bleed stream containing substantial amounts of sodium tripolyphosphate to supply sodium values to the wet acid in the pretreatment stage (with added $SiO_2$) to reduce the level of fluoride ions in this stage by precipitating $Na_2SiF_6$.

TABLE

| Sample Treated | % H₃PO₄ pH 4 | % H₃PO₄ pH 9 | % Monosodium Orthophosphate Content** | Fluoride Content |
|---|---|---|---|---|
| Wet Acid (Without Treatment) | 74.2 | 74.8 | 0.6% | 2500 ppm |
| Wet Acid (Celite + Na₂CO₃) | 54.1 | 59.3 | 5.2% | 1600 ppm* |
| Wet Acid (Celite + Na₅P₃O₁₀) | 55.5 | 60.7 | 5.2% | 1700 ppm* |

*Precipitate of Na₂SiF₆ separated.
**By difference of % H₃PO₄ at pH 4 and pH 9.

I claim:

1. A process producing sodium tripolyphosphate from wet acid comprising:
   (a) introducing said wet acid containing fluorides into a pretreatment stage, adding silicon dioxide and sodium hydroxide or a sodium salt and precipitating insoluble fluorides,
   (b) separating the insoluble fluorides from the resulting pretreated wet acid,
   (c) introducing the pretreated wet acid of step (b) into a solvent extraction zone with a substantially water insoluble organic phosphate extractant and extracting phosphoric acid values from such pretreated wet acid,
   (d) stripping the extracted phosphoric acid values from the loaded organic phosphate extractant of step (c) with an aqueous stripping solution, and recovering a purified phosphoric acid,
   (e) adding the purified phosphoric acid to a make up stage and reacting it with sodium hydroxide or a sodium salt to produce a sodium orthophosphate liquor having a Na:P mole ratio of about 1.67:1,
   (f) introducing the sodium orthophosphate liquor into a heating zone to form sodium tripolyphosphate and recovering same,
   (g) passing gases evolved in the heating zone through a scrubbing zone containing a scrubber liquor and scrubbing fluoride values and entrained sodium tripolyphosphate from said gases into said scrubber liquor,
   (h) recycling scrubber liquor to the make up stage,
   (i) removing a bleed stream from said recycling scrubber liquor and introducing said bleed stream into said pretreatment stage in amounts sufficient to prevent fluoride impurities from preciptitating in said recycling scrubber liquor.

2. Process of claim 1 wherein the sodium salt in step (a) and step (e) is sodium carbonate.

3. Process of claim 1 wherein the organic phosphate extractant is tri-n-butylphosphate.

4. Process of claim 3 wherein the organic phosphate extractant is diluted with an organic solvent.

5. Process of claim 4 wherein the organic solvent is N-hexane.

6. Process of claim 1 wherein a strong mineral acid is added into said solvent extraction zone.

7. Process of claim 6 wherein said strong mineral acid is sulfuric acid.

8. Process of claim 1 wherein prior to stripping the extracted phosphoric acid values in step (d), the loaded organic phosphate extractant is scrubbed with a purified phosphoric acid to reduce the metal impurity level thereof.

9. Process of claim 1 wherein the heating zone is a spray drying zone, wherein the sodium orthophosphate solution is sprayed into a finely atomized state and is heated by hot downwardly directed gases to rapidly form sodium tripolyphosphate.

10. Process of claim 9 wherein the sodium tripolyphosphate is formed in the spray dryer in from one to five minutes.

11. Process of claim 1 wherein the heating zone is a rotary kiln, wherein the sodium orthophosphate solution is placed into the upper end of a rotating, inclined kiln and is heated within the rotary kiln until sodium tripolyphosphate is produced and is removed from the lower end of the kiln.

12. Process of claim 1 wherein the bleed stream removed from said recycled scrubber liquor is sufficient to maintain the fluoride level in said recycled scrubber liquor at a concentration of about 1500 ppm.

13. Process of claim 1 wherein the bleed stream comprises up to the same volume as the volume of scrubber liquor recycled to the make up stage.

14. Process of claim 1 wherein the bleed stream comprises the same volume as the volume of scrubber liquor recycled to the make up stage.

* * * * *